Figure 1:
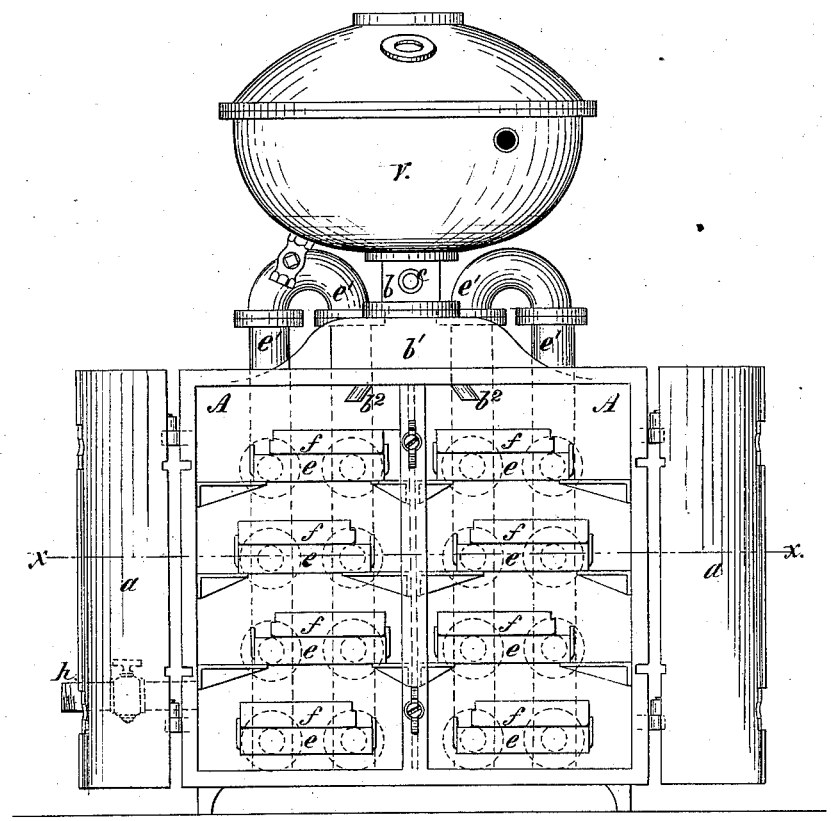

2 Sheets--Sheet 1.

F. O. MATTHIESSEN.
Apparatus for Refining Sugar.

No. 163,093. Patented May 11, 1875.

Witnesses:

Inventor:
Franz O. Matthiessen
Per Edw. E. Quimby
Atty.

THE GRAPHIC CO. PHOTO-LITH. 39 & 41 PARK PLACE, N.Y.

F. O. MATTHIESSEN.
Apparatus for Refining Sugar.
No. 163,093. Patented May 11, 1875.
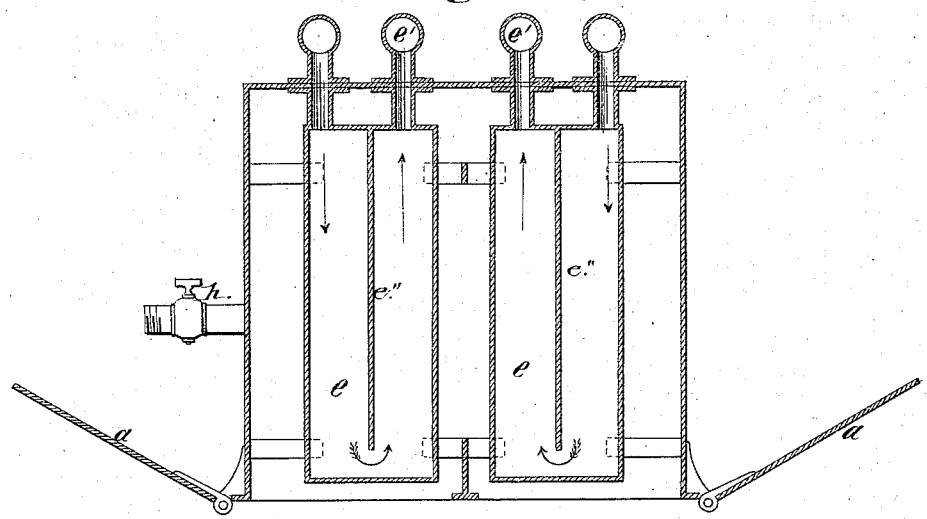
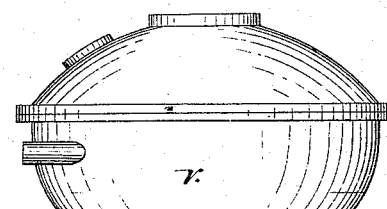
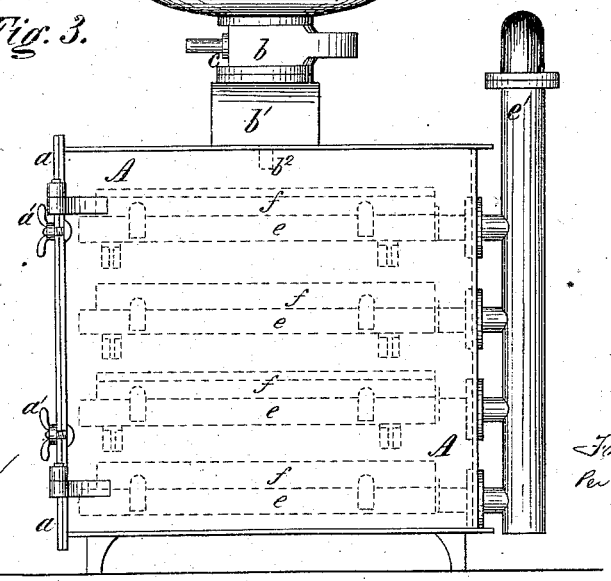
Witnesses:
Edw. W. Down
M. Gardner
Inventor:
Franz O. Matthiessen
Per Edw. E. Quimby
Atty.

UNITED STATES PATENT OFFICE.

FRANZ O. MATTHIESSEN, OF NEW YORK, N. Y.

IMPROVEMENT IN APPARATUS FOR REFINING SUGAR.

Specification forming part of Letters Patent No. 163,093, dated May 11, 1875; application filed April 14, 1875.

CASE E.

*To all whom it may concern:*

Be it known that I, FRANZ O. MATTHIESSEN, of the city and State of New York, have invented certain Improvements in Apparatus for Refining Sugar, of which the following is a specification:

My improvements relate to apparatus for conducting my improved process of refining sugar, whereby the sugar-mass discharged from the vacuum-pan after the usual boiling is wholly converted into coffee-sugar without leaving any fluid remainder in the form of sirup.

My invention consists in arranging, in combination with the vacuum-pan, a vacuum-chamber containing removable trays or pans placed upon hollow shelves or supports, in which a hot-water or hot-air circulation is maintained, my vacuum-chamber being provided with hermetically-closing doors, which can be opened to admit of the introduction or removal of the trays.

The accompanying drawings are as follows: Figure 1 is a front view of a vacuum-pan connected with my vacuum-chamber, the latter having its doors open so as to exhibit the interior arrangement of the hollow shelves which support the trays in which the sugar product from the vacuum-pan is deposited; also showing the injection-pipes for directing the sugar product to the upper trays, from which it overflows to the trays next beneath, and so on. Fig. 2 is a horizontal section through the line $x\,x$ on Fig. 1, showing the connections for establishing the hot-water circulation. Fig. 3 is a side elevation, showing the clamps for hermetically closing the doors, and the hot-water connections with the various shelves.

My vacuum-chamber A is provided with doors $a\,a$, which are hermetically closed by means of the clamps $a'\,a'$. An external valve, $b$, closes the injection-pipe $b^1$, and $b^2\,b^2$ are branches, by means of which the injected product from the vacuum-pan V is discharged upon the right and the left hand trays. $c$ is a small pipe for connection with an exhauster, so that when the valve $b$ is closed a more or less partial vacuum can be maintained in the chamber A.

The hollow shelves $e\,e$ are connected with the upright hot-water pipes $e'\,e'$. The rim of each of the trays or pans $f$ is lower on one side than the other, to allow the overflow of the material operated upon when the pan has received the proper quantity. The lower pans are so placed, relatively to the upper pans, that they each receive the overflow from the pans next above them. Each of the hollow shelves has a central vertical partition, $e''$, open at the end opposite the connecting-pipes, and the direction of the hot-water or hot-air circulation is shown by the arrows in Fig. 2. An exhaust-pipe, $c$, is connected with the injection-pipe $b^1$, below the valve $b$, for the purpose of withdrawing air from the interior of the chamber, when the doors are hermetically closed, so as to create a partial vacuum therein.

In case it should be desired to subject the material operated upon in the trays to the direct action of hot air, the vacuum-chamber is provided with a hot-air injection-pipe, $h$.

The peculiarities of this apparatus are, first, that the trays in which the sugar mass is deposited are supported in horizontal positions, and are removable; and, secondly, that the doors of the vacuum-chamber, which open to allow of access to the interior of the chamber for the introduction or removal of the trays, are capable of being hermetically closed, so as to preserve the vacuum in the chamber; thirdly, that the apparatus includes a provision for the introduction of hot air into the chamber, in addition to the system of pipes in which a hot-air or hot-water circulation is maintained, so that the material contained in the trays may be heated by radiation from the surface of the hot-air or hot-water pipes, or by the direct action of hot air introduced into the chamber.

I claim as my invention—

1. In combination with a vacuum-pan, a vacuum-chamber provided with heating-shelves and removable trays or pans, substantially as and for the purpose set forth.

2. A chamber containing heating-shelves and provided with an exhaust-pipe for withdrawing the air from the chamber, and having a removable side capable of hermetical application.

3. In combination with a vacuum-pan, a vacuum-chamber provided with heating-shelves, and a hot-air injection-pipe and removable trays or pans, for the purpose of heating the material contained in the trays or pans by direct contact with hot air, substantially as set forth.

F. O. MATTHIESSEN.

Witnesses:
 ISAAC ROMAINE,
 E. FUCHS.